United States Patent
Shi et al.

(10) Patent No.: US 12,270,486 B2
(45) Date of Patent: Apr. 8, 2025

(54) ELECTROMAGNETIC VALVE

(71) Applicant: ZHEJIANG SANHUA AUTOMOTIVE COMPONENTS CO., LTD., Zhejiang (CN)

(72) Inventors: Ying Shi, Zhejiang (CN); Liwei Wu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 47 days.

(21) Appl. No.: 18/038,464

(22) PCT Filed: Nov. 23, 2021

(86) PCT No.: PCT/CN2021/132294
§ 371 (c)(1),
(2) Date: May 24, 2023

(87) PCT Pub. No.: WO2022/111440
PCT Pub. Date: Jun. 2, 2022

(65) Prior Publication Data
US 2024/0011575 A1    Jan. 11, 2024

(30) Foreign Application Priority Data
Nov. 24, 2020   (CN) .......................... 202022747221.9

(51) Int. Cl.
F16K 31/06   (2006.01)
(52) U.S. Cl.
CPC ...... F16K 31/0696 (2013.01); F16K 31/0675 (2013.01)
(58) Field of Classification Search
CPC ........................... F16K 31/0696; F16K 31/408
See application file for complete search history.

(56) References Cited

U.S. PATENT DOCUMENTS 3,100,103 A * 8/1963 Bullard ................. F16K 31/408
251/38
3,523,676 A * 8/1970 Barker ................ F16K 31/0693
251/129.05
(Continued)

FOREIGN PATENT DOCUMENTS

CN   2731197 Y   10/2005
CN   202254535 U   5/2012
(Continued)

OTHER PUBLICATIONS

DE-102014210658-A1 Translation (Year: 2015).*
(Continued)

*Primary Examiner* — Umashankar Venkatesan
(74) *Attorney, Agent, or Firm* — Yue (Robert) Xu; Apex Attorneys at Law, LLP

(57) ABSTRACT

Disclosed is an electromagnetic valve, comprising an iron core assembly, a sleeve, a first spring, and a cushioning member. Part of the iron core assembly is located on the inner circumference of the sleeve, the sleeve comprises a bottom, the bottom is located at one end of the sleeve in the axial direction of the sleeve, the iron core assembly comprises a hole portion, the hole portion has a hole, the hole has an opening facing the bottom in the iron core assembly, and at least part of the first spring is located in the hole; in the axial direction of the sleeve, part of the cushioning member is located between the bottom and the first spring, one end of the cushioning member is in contact with the bottom, one end of the first spring is in contact with the cushioning member.

6 Claims, 4 Drawing Sheets

(56) References Cited

U.S. PATENT DOCUMENTS

| | | | | |
|---|---|---|---|---|
| 3,707,992 | A * | 1/1973 | Ellison | F16K 31/0696 |
| | | | | 251/282 |
| 3,974,998 | A * | 8/1976 | Wood | B05B 9/03 |
| | | | | 137/594 |
| 4,592,533 | A * | 6/1986 | Guglielmi | F16K 31/408 |
| | | | | 251/30.01 |
| 5,156,184 | A * | 10/1992 | Kolchinsky | F16K 31/0613 |
| | | | | 137/625.65 |
| 10,408,361 | B2 * | 9/2019 | Jin | F16K 31/1635 |
| 11,754,197 | B2 * | 9/2023 | Okamoto | F16K 1/523 |
| | | | | 251/129.15 |
| 2011/0308621 | A1 * | 12/2011 | Christensen | F16K 31/408 |
| | | | | 137/1 |
| 2016/0251008 | A1 | 9/2016 | Eon et al. | |
| 2018/0209559 | A1 | 7/2018 | Godbillon et al. | |

FOREIGN PATENT DOCUMENTS

| | | | | |
|---|---|---|---|---|
| CN | 107850235 | A | | 3/2018 |
| CN | 109340403 | A | | 2/2019 |
| CN | 210440503 | U | | 5/2020 |
| CN | 214093242 | U | | 8/2021 |
| DE | 10332345 | A1 | | 8/2004 |
| DE | 102014210658 | A1 * | 12/2015 | ......... A47L 15/4409 |
| GB | 1317390 | A | | 5/1970 |
| JP | H0833303 | A | | 2/1996 |
| JP | 2001214506 | A | | 8/2001 |
| JP | 2014156921 | A | | 8/2014 |
| JP | 6064152 | B2 | | 1/2017 |
| JP | 2017141933 | A | | 8/2017 |
| KR | 20190028923 | A | | 3/2019 |
| WO | 2018197102 | A1 | | 11/2018 |

OTHER PUBLICATIONS

The Japanese 1st Office Action issued on Feb. 6, 2024 for JP2023-531660.

International Search Report for PCT/CN2021/132294 mailed Feb. 28, 2022, ISA/CN.

The European search report issued on Sep. 23, 2024 for EP21896941.8.

The Korean 1st Office Action issued on Jun. 21, 2024 for KR10-2023-7021017.

* cited by examiner

ELECTROMAGNETIC VALVE

This disclosure is a national phase application of PCT international patent application PCT/CN2021/132294, filed on Nov. 23, 2021 which claims the benefit of the priority to Chinese Patent Disclosure No. 202022747221.9, titled "ELECTROMAGNETIC VALVE", filed with the China National Intellectual Property Administration on Nov. 24, 2020, which are incorporated herein by reference in its entirety.

FIELD

The present disclosure relates to the field of fluid control, and in particular to an electromagnetic valve.

BACKGROUND

In the field of fluid control, the electromagnetic valve, as a control component for controlling on/off of the flow path, includes an iron core assembly and a sleeve, when the electromagnetic valve is in operation, the return noise caused by the collision between the iron core assembly and the sleeve is a technical problem to be solved.

SUMMARY

An object of the present disclosure is to provide an electromagnetic valve, which is beneficial to reduce the return noise caused by the collision between the iron core assembly and the sleeve when the electromagnetic valve is in operation.

An electromagnetic valve, including an iron core assembly, a sleeve, a first spring and a buffer member, part of the iron core assembly is arranged on an inner periphery of the sleeve, the sleeve includes a bottom portion, in an axial direction of the sleeve, the bottom portion is located at one end of the sleeve, the iron core assembly includes a hole portion, where the hole portion is provided with holes, the hole has an opening toward the bottom portion on the iron core assembly, and at least part of the first spring is located in the hole; in the axial direction of the sleeve, part of the buffer member is located between the bottom portion and the first spring, one end of the buffer member is in contact with the bottom portion, and one end of the first spring is in contact with the buffer member, the iron core assembly is able to be in contact with the buffer member.

The electromagnetic valve includes the iron core assembly, the sleeve, the first spring and the buffer member, the buffer member is located between the bottom of the sleeve and the iron core assembly, the first spring is located in the hole of the iron core assembly, one end of the first spring is in contact with the buffer member, so that the buffer member is relatively fixed at the bottom of the sleeve, when the electromagnetic valve is deenergized, the iron core assembly may first is in contact with the buffer during upward movement, thus slowing down the collision between the iron core assembly and the bottom, which is beneficial to reducing the return noise of the electromagnetic valve; in addition, the buffer member is limited and fixed by the first spring, which makes the installation of the buffer member convenient without changing the structure of other parts of the electromagnetic valve.

DETAILED DESCRIPTION OF THE EMBODIMENTS

The present disclosure is further illustrated hereinafter in conjunction with drawings and specific embodiments.

In the following description of the embodiments, in order to facilitate understanding, terms indicating directions (for example, "above", "below", etc.) are appropriately used, taking the electromagnetic valve in FIG. 1 as an example, it defines that the coil assembly is located above the valve body, the valve body is located below the coil assembly, and the axial direction of the electromagnetic valve is the up-down direction.

Figure 1:
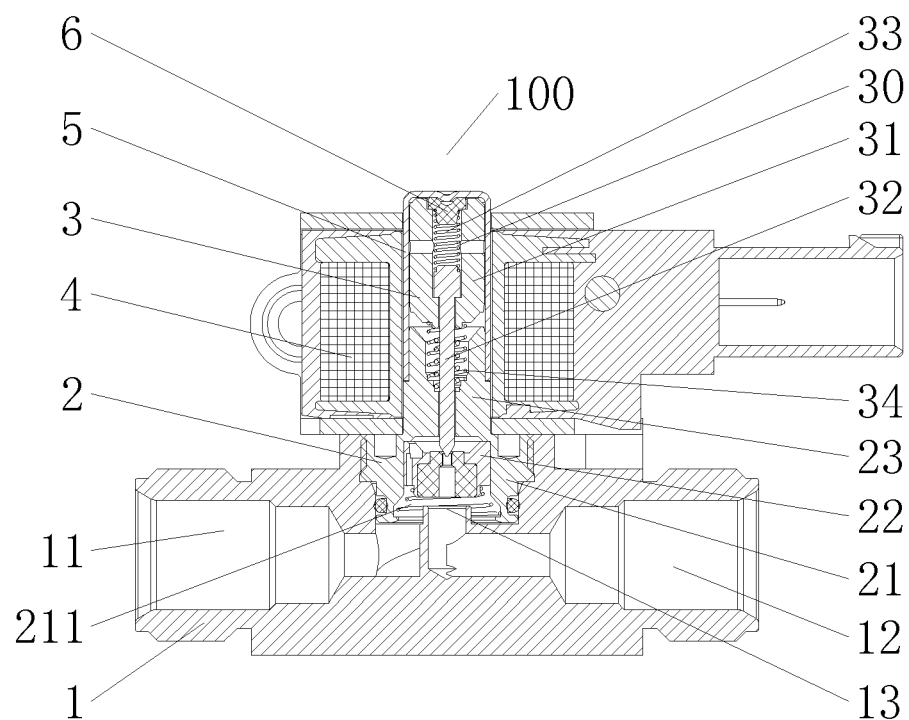
FIG. 1 is a schematic cross-sectional view of an electromagnetic valve according to the technical solution of the present disclosure.

Referring to FIG. 1, the electromagnetic valve 100 includes a valve body 1, a valve assembly 2, an iron core assembly 3, a coil assembly 4 and a sleeve 5, part of the valve assembly 2 is located in an inner cavity of the valve body 1, and part of the sleeve 5 is located above the valve assembly 2, one end of the sleeve 5 is fixedly connected with the valve assembly 2 and sealed at the connection, part of the iron core assembly 3 is located on an inner periphery of the sleeve 5 and above the valve assembly 2, and the coil assembly 4 is sleeved on the periphery of the part of the valve assembly 2, part of the iron core assembly 3 and part of the sleeve 5.

The valve assembly 2 includes a valve seat 21, a valve core 22 and a suction portion 23, the suction portion 23 is located above the valve seat 21. In this embodiment, the suction portion 23 and the valve seat 21 are in an integrated structure, in other embodiments, the suction portion 23 and the valve seat 21 may also be in separate, the suction portion 23 and the valve seat 21 are fixed by welding, bonding or screwing; at least part of the valve seat 21 is located in the inner cavity of the valve body 1 and is relatively fixed with the valve body 1 by means of welding or screwing; in this embodiment, the valve seat 21 is screwed to the valve body 1. The electromagnetic valve 100 is provided with a valve cavity 211, and the valve cavity 211 is located between the valve body 1 and the valve seat 21. A wall forming the valve cavity 211 includes an inner wall of the valve body 1 and an inner wall of the valve seat 21. The valve core 22 is located in the valve cavity 211 and can be moved in the axial direction of the electromagnetic valve 100 in the valve cavity 211. The sleeve 5 is a hollow cylindrical member with one end open and the other end closed, specifically, the sleeve 5 includes a bottom portion 51 and an opening portion 52, in the axial direction of the sleeve 5, the bottom portion 51 is located at one end of the sleeve and the opening portion 52 is located at the other end of the sleeve 5; the bottom portion 51 is formed as the closed end of the sleeve 5, and the opening portion 52 is formed as the open end of the sleeve 5. The opening portion 52 of the sleeve 5 is fixedly connected with the upper end of the suction portion 23 and sealed at the connection, specifically, the opening portion 52 of the sleeve 5 is joined with the suction portion 23 at an outer periphery of an upper end of the suction portion 23, an inner wall of the opening portion 52 and an outer wall of the upper end of the suction portion 23 are sealed and fixed by welding or bonding. Part of the iron core assembly 3 is accommodated in the sleeve 5, and the iron core assembly 3 is closer to the bottom portion 51 than the valve assembly 2, in case that the electromagnetic valve 100 is in a deenergized or reset state, the iron core assembly 3 can abut against the bottom portion 51. Specifically, the iron core assembly 3 includes a movable iron core 31 and a valve stem 32. In the axial direction of the electromagnetic valve 100, the movable iron core 31 is located above the suction portion 23 and is located in the inner circumference of the sleeve 5. In other words, the movable iron core 31 is closer to the bottom portion 51 of the sleeve 5 than the suction portion 23, and one end of the valve stem 32 is limitedly connected with the movable iron core 31. After the electromagnetic valve 100 is energized, the other end of the valve stem 32 can be in contact with the valve core 22, the movable iron core 31 is able to move in the axial direction of the electromagnetic valve 100 within the sleeve 5, and then the movable iron core 31 is able to drive the valve stem 32 to move in the axial direction of the electromagnetic valve 100, so that the valve stem 32 is in contact with or separates from the valve core 22. The coil assembly 4 has a through hole, in which part of the suction portion 23, part of the iron core assembly 3 and part of the sleeve 5 are located, the coil assembly 4 is located above the valve body 1 and one end of the coil assembly 4 is fixedly connected with the valve body 1. A first passage 11, a second passage 12 and a valve port 13 is formed in the valve body 1. The first passage 11 is in communication with the valve cavity 211, the valve port 13 is in communication with the second passage 12, and the working medium can be flowed into the valve cavity 211 through the first passage 11. When the valve core 22 departs from the valve port 13, the working medium is flowed into the second passage 12 through the valve port 13. When the electromagnetic valve 100 is energized or de-energized, the movable iron core 31 can drive the valve stem 32 to be moved in the axial direction of the electromagnetic valve 100, and then the valve stem 32 drives the valve core 22 to move in the up and down direction of the valve assembly 2 within the valve cavity 211, thereby opening or closing the valve port 13, and thus switch on or off the electromagnetic valve 100. In this embodiment, the axial direction of the electromagnetic valve 100 is the same as the axial direction of the sleeve 5.

Figure 2:
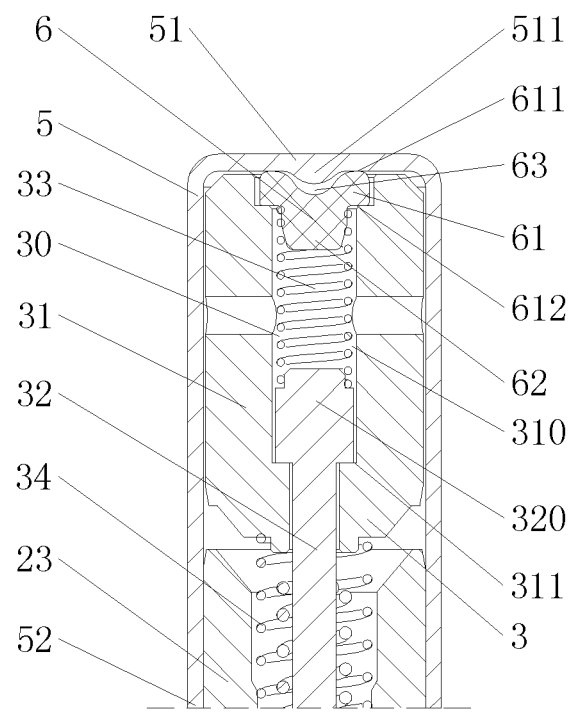
FIG. 2 is a partial sectional structural diagram of the electromagnetic valve of a first embodiment in a deenergized state.

Referring to FIG. 1 and FIG. 2, the iron core assembly 3 includes a hole portion 30, the hole portion 30 is provided with a hole 310, and the hole 310 has an opening toward the bottom portion 51 in the iron core assembly 3, specifically, the hole 310 is formed in the movable iron core 31. In the axial direction of movable iron core 31, the hole 310 is extended through the upper and lower surfaces of the movable iron core 31, part of the valve stem 32 is located in the hole 310 and limitedly connected with the hole portion 30. Specifically, the valve stem 32 includes a limit boss 320, which is formed at one end of the valve stem 32 in the axial direction of the valve stem 32, the valve stem 32 is extended through the suction portion 23, and the limit boss 320 at one end of the valve stem 32 is matched with the hole 310; the hole portion 30 includes a large diameter section and a small diameter section, and a first step 311 is formed between the large diameter section and the small diameter section of the hole portion 30, the limit boss 320 is located in the large diameter section of the hole portion 30 and can be moved in the axial direction of the movable iron core 31 within the large diameter section, the limit boss 320 can abut against the first step 311, and the limit boss 320 and the first step 311 are in a limiting connection.

Figure 3:
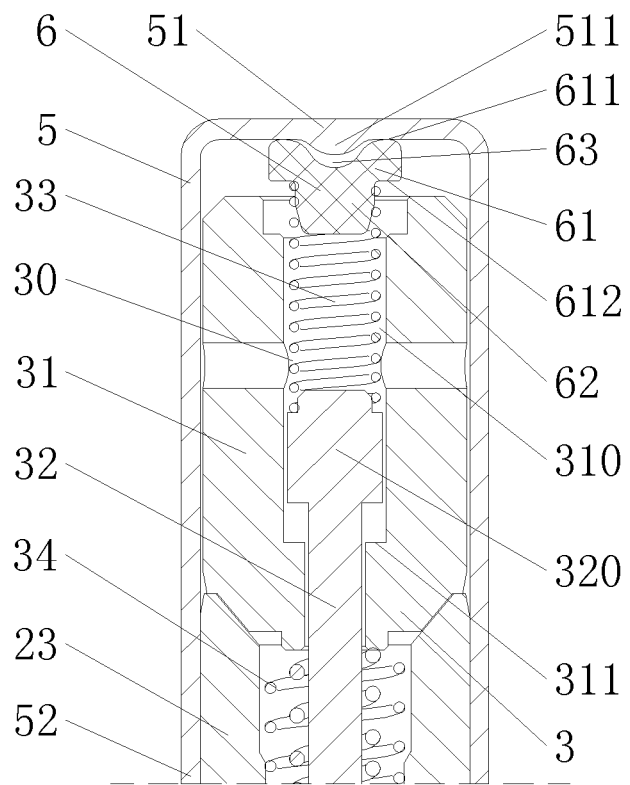
FIG. 3 is a partial sectional structural diagram of the electromagnetic valve of the first embodiment in an energized state.

The electromagnetic valve 100 includes a first spring 33 and a second spring 34, the first spring 33 and the second spring 34 are both composed of compression coil springs, at least part of the first spring 33 is located in the hole 310. In the axial direction of the sleeve 5, the first spring 33 is located between the bottom portion 51 and the valve stem 32, and one end of the first spring 33 abuts against the limit boss 320, and in that case, the first spring 33 always exerts elastic force on the valve stem 32, so that the limit boss 320 is kept in contact with the first step 311, which facilitates that the valve stem 32 is moved followed with the action of the movable iron core 31. In the axial direction of the sleeve 5, the second spring 34 is located between the movable iron core 31 and the suction portion 23, the second spring 34 always exerts elastic force on the movable iron core 31, in case that the electromagnetic valve 100 is disenergized, the suction portion 23 does not generate electromagnetic attraction force, the movable iron core 31 is thus abutted against the bottom portion 51 of the sleeve 5 by the upward elastic force of the second spring 34, and the electromagnetic valve 100 is in an open state, as shown in FIG. 2. In case that the electromagnetic valve 100 is energized, the suction portion 23 and the movable iron core 31 are magnetized, and an electromagnetic attraction force is generated between the suction portion and the movable iron core; the movable iron core 31 is moved downward against the elastic force of the second spring 34. Since the first spring 33 always abuts against the limit boss 320, the limit boss 320 is limitedly connected with the first step 311, and thus the valve stem 32 is moved down synchronously with the movable iron core 31 under the elastic force of the first spring 33 until the lower end of the valve stem 32 is in contact with the valve core 22, and then the valve stem 32 pushes the valve core 22 to move towards the valve port 13 until the valve core 22 closes the valve port 13. In that case, the valve stem 32 and the valve core 22 are sealed, and the valve core 22 and the valve port 13 are sealed, the electromagnetic valve 100 completes the valve closing action, as shown in FIG. 3. When the electromagnetic valve 100 is deenergized again, the movable iron core 31 is moved upward to the original position by the elastic force of the second spring 34, the first step 311 abuts against the limit boss 320, so that the movable iron core 31 drives the valve stem 32 to move upward together until the movable iron core 31 abuts against the bottom portion 51 of the sleeve 5, and thus the valve stem 32 is driven by the movable iron core 31 to depart from the valve core 22, and the electromagnetic valve 100 completes the valve opening action, as shown in FIG. 2.

Referring to FIG. 2 and FIG. 3, the electromagnetic valve 100 includes a buffer member 6, part of the buffer member 6 is located between the bottom portion 51 and the first spring 33 in the axial direction of the sleeve 5, specifically, in the axial direction of the sleeve 5, one end of the buffer member 6 is in contact with the bottom portion 51. Moreover, as the first spring 33 is located between the buffer member 6 and the valve stem 32, and one end of the first spring 33 is in contact with the buffer member 6, the other end of the first spring 33 abuts against the valve stem, part of the buffer member 6 is located on the inner periphery of the first spring 33, and thus the buffer member 6 is limited and fixed between the sleeve 5 and the first spring 33 in the axial direction. Since the first spring 33 is located within the iron core assembly 3, it can be understood that the buffer member 6 is limited and fixed between the sleeve 5 and the iron core assembly 3 in the axial direction. In addition, when the electromagnetic valve 100 is not energized, at least part of the buffer member 6 is located in the hole 310 of the movable iron core 31, the buffer member 6 is in contact both with the first spring 33 and the movable iron core 31 at the side axial opposite to the side contacting the bottom portion 51, as shown in FIG. 2.

Figure 4:
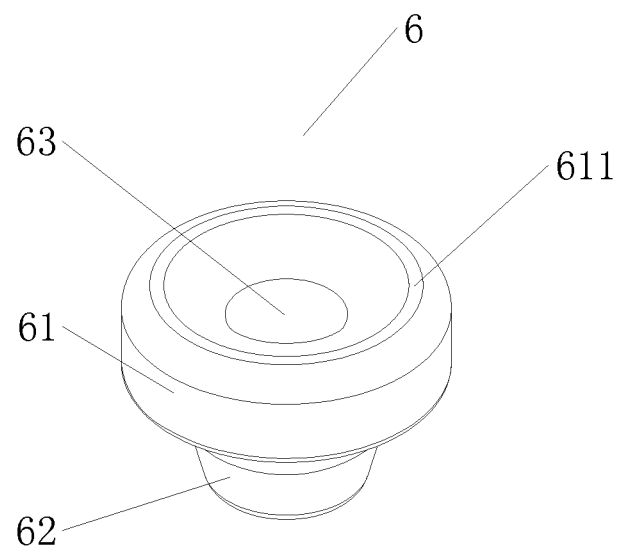
FIG. 4 is a schematic diagram of a three-dimensional structure of a buffer member of the first embodiment.
Figure 5:
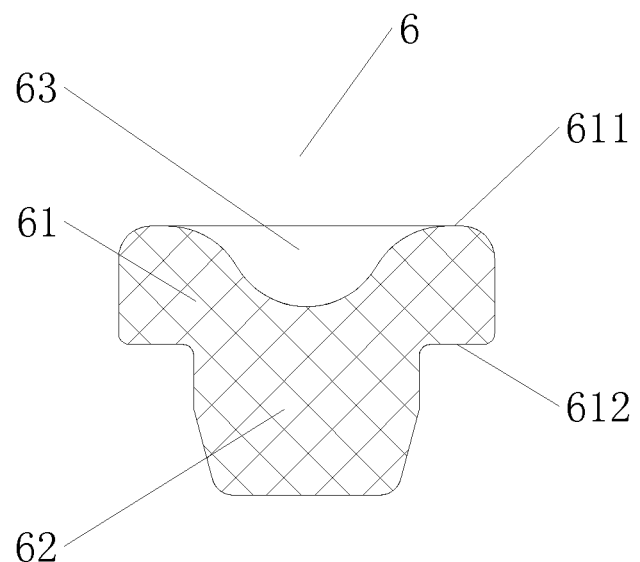
FIG. 5 is a schematic cross-sectional view of the buffer member of the first embodiment.

Referring to FIG. 4 and FIG. 5, the buffer member 6 is a rubber structure with substantially T-shaped cross section, specifically, the buffer member 6 includes a main body portion 61 and a branch portion 62. In the axial direction of the electromagnetic valve 100, the branch portion 62 is located below the main body portion 61, and one end of the branch portion 62 is substantially vertically connected to the lower wall of the main body portion 61, in other words, the branch portion 62 is convex relative to the lower wall of the main body portion 61, and the branch portion 62 and the main body portion 61 are integrally formed, the outer diameter of the main body portion 61 is larger than the outer diameter of the branch portion 62, and the main body portion 61 is substantially in a circular plate-like structure, and the branch portion 62 is substantially in a cylindrical structure, the design of which is beneficial to structural stability of the buffer member 6 and facilitates of manufacturing and processing of the buffer member 6. The main body portion 61 includes a first wall 611 and a second wall 612, the first wall 611 is formed on the upper wall of the main body portion 61, and the second wall 612 is formed on the lower wall of the main body portion 61, the branch portion 62 is connected to the second wall 612, and the branch portion 62 protrudes toward the movable iron core 31 relative to the second wall 612. At least part of the buffer member 6 is located in the inner ring of the first spring 33, specifically, the branch portion 62 is embedded in the first spring 33, the first wall 611 of the main body portion 61 is in contact with the bottom portion 51, and the second wall 612 of the main body portion is in contact with the first spring 33. In that case, the buffer member 6 is fixed in the axial direction, and the second wall 612 can still be in contact with the movable iron core 31 in case that the electromagnetic valve 100 is deenergized. In addition, one end of the branch portion 62 away from the main body portion 61 is arranged in a rounded shape, so that the branch portion 62 can be embedded into the inner ring of the first spring 33.

The operation principle: in case that the electromagnetic valve 100 is deenergized, the movable iron core 31 is moved up within the sleeve 5 in the axial direction under the elastic force of the second spring 34, and the movable iron core 31 is in contact with the main body portion 61 of the buffer member 6; specifically, the upper wall of the movable iron core 31 is in contact with the second wall 612, and the main body portion 61 can provide sufficient area for the moving iron core 33 to collide, the collision between the movable iron core 31 and the bottom portion 51 during the reset process can be damped, thereby reducing the reset noise, as shown in FIG. 2. In addition, in case that the electromagnetic valve 100 is energized, the movable iron core 31 is moved downward in the axial direction under the electromagnetic force of the suction portion 23, and the movable iron core 31 departs from the buffer member 6; since one end of the first spring 33 is in contact with the second wall 612, and the other end of the first spring 33 is kept in abutment with the valve stem 32, the buffer member 6 can still be fixed in the axial direction without falling under the elastic force of the first spring 33, as shown in FIG. 3.

Referring to FIG. 2, FIG. 3, FIG. 4 and FIG. 5, the first concave portion 63 is formed on the main body portion 61, specifically, the first concave portion 63 has an opening in the surface of the first wall 611, and the first concave portion 63 is recessed inward relative to the surface of the first wall 611. Accordingly, the sleeve 5 has a first convex portion 511, which is formed at the bottom portion 51 of the sleeve 5, in the axial direction of the sleeve 5, the first convex portion 511 projects toward the buffer member 6 relative to the lower surface of the bottom portion 51, the first convex portion 511 is located in and in contact with the first concave portion 63, and thus the buffer member 6 is limited in the radial direction relative to the sleeve 5, which facilitates of further improving the installation stability of the buffer member 6 in the electromagnetic valve 100, avoiding the misplacement or falling off of the buffer member 6 during the operation of the electromagnetic valve 100, and improving the practicability of the electromagnetic valve 100.

Figure 6:
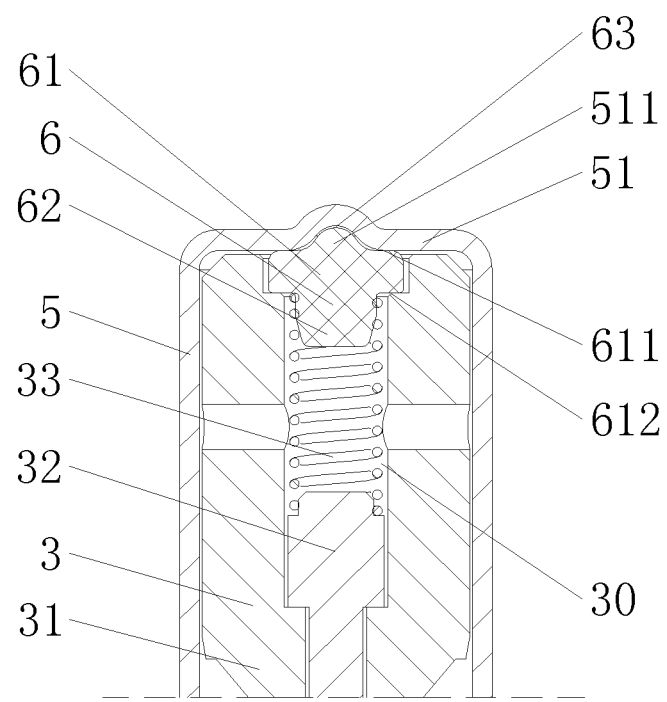
FIG. 6 is a partial sectional structural diagram of the electromagnetic valve of a second embodiment in a deenergized state.

Of course, in other embodiments, the first concave portion 63 may also be arranged on the sleeve 5, and the first convex portion 511 may also be arranged on the buffer member 6. Specifically, the sleeve 5 includes the first concave portion 63, which is formed on the bottom portion 51; in the axial direction of the sleeve 5, the first concave portion 63 has an opening on the lower surface of the bottom portion 51, and the first concave portion 63 is recessed inward relative to the lower surface of the bottom portion 51; the buffer member 6 includes a first convex portion 511, which is formed on the main body portion 62, the first convex portion 511 is convex to the bottom portion 51 relative to the first wall 611, the first convex portion 511 is located in and in contact with the first concave portion 63 to form a radial limit, as shown in FIG. 6.

Figure 7:
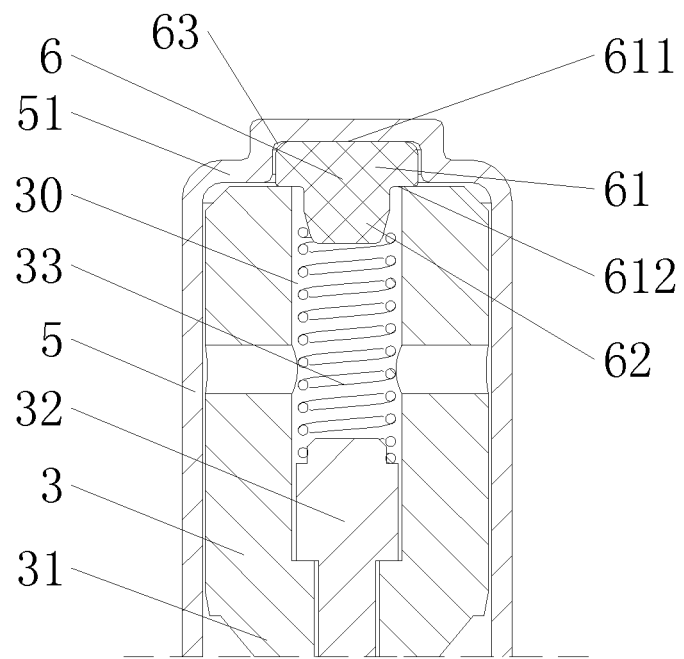
FIG. 7 is a partial sectional structural diagram of the electromagnetic valve of a third embodiment in a deenergized state.

In other embodiments, referring to FIG. 7, the sleeve 5 includes the first concave portion 63, which is formed on the bottom portion 51; in the axial direction of the sleeve 5, the first concave portion 63 has an opening on the lower surface of the bottom portion 51, and the first concave portion 63 is recessed inward relative to the lower surface of the bottom portion 51. Part of the buffer member 6 is located in the first concave portion 63, and the buffer member 6 is in interference fit with the first concave portion 63, specifically, part of the main body portion 61 is located in the first concave portion 63, the first wall 611 is in contact with the bottom wall of the first concave portion 63, and the second wall 612 is located below the opening of the first concave portion 63, the side wall of the main body portion 61 is clearance fit with the side wall of the first concave portion 63. In that case, without changing the structure of the buffer member 6, the buffer member 6 is limited in the radial direction relative to the sleeve 5, which improves the installation stability of the buffer member 6 and simplifies the manufacturing process.

Figure 8:
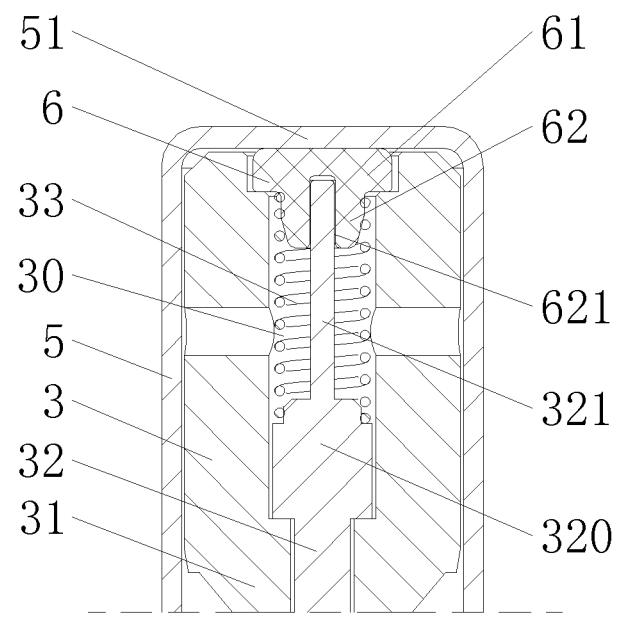
FIG. 8 is a partial sectional structural diagram of the electromagnetic valve of a fourth embodiment in a deenergized state.

In other embodiments, referring to FIG. 8, the valve stem 32 includes a second convex portion 321, specifically, the second convex portion 321 is formed on the limit boss 320, in the axial direction of the valve stem 32, the second convex portion 321 protrudes toward the bottom portion 51 of the sleeve 5 relative to the upper surface of the limit boss 320. Accordingly, the buffer member 6 has an accommodating cavity 621, specifically, the accommodating cavity 621 is formed in the branch portion 62, the accommodating cavity 621 has an opening on the lower surface of the branch portion 62, and the accommodating cavity 621 is recessed inward relative to the lower surface of the branch portion 62. The second convex portion 321 is located in the accommodating cavity 621, and the second convex portion 321 is in clearance fit with the accommodating cavity 621. In this embodiment, the buffer member 6 is limited in the radial direction by the valve stem 32, which further improves the installation stability of the buffer member 6.

Technical features of the foregoing embodiments may be combined freely. For conciseness of description, all possible combinations of the technical features of the foregoing embodiments are not described. However, as long as there is no contradiction in the combinations of these technical features, they shall fall within the scope of this specification.

Although the present disclosure is described in detail hereinabove with reference to the above embodiments, those of ordinary skill in the art should understand that modification or equivalent replacement may be made to the present disclosure, and all technical solutions and improvements thereof that do not depart from the spirit and scope of the present disclosure should be covered by the scope of the claims of the present disclosure.

The invention claimed is:

1. An electromagnetic valve, comprising an iron core assembly, a sleeve, a first spring and a buffer member, wherein part of the iron core assembly is arranged on an inner periphery of the sleeve, the sleeve comprises a bottom portion, in an axial direction of the sleeve, the bottom portion is located at one end of the sleeve, the iron core assembly comprises a hole portion, wherein the hole portion is provided with holes, the hole has an opening toward the bottom portion on the iron core assembly, and at least part of the first spring is located in the hole; wherein, in the axial direction of the sleeve, part of the buffer member is located between the bottom portion and the first spring, one end of the buffer member is in contact with the bottom portion, and one end of the first spring is in contact with the buffer member, the iron core assembly is able to be contact with the buffer member, wherein the iron core assembly comprises a movable iron core and a valve stem, the hole portion is arranged on the movable iron core, in the axial direction of the sleeve, the hole is extended through the movable iron core, part of the valve stem is located in the hole, and the valve stem is limitedly connected with the hole portion; wherein, in the axial direction of the sleeve, at least part of the first spring is located between the buffer member and the valve stem, the other end of the first spring abuts against the valve stem, wherein the buffer member comprises a main body portion and a branch portion, the main body portion comprises a first wall and a second wall; wherein, in the axial direction of the sleeve, the first wall is in contact with the bottom portion, the second wall is in contact with the first spring, the second wall is capable of being in contact with the movable iron core; the branch portion protrudes toward the movable iron core relative to the second wall, the branch portion is integrated with the main body portion and is embedded in the first spring, wherein the valve stem comprises a second convex portion, the second convex portion is formed on the limit boss of the valve stem; wherein, in the axial direction of the sleeve, the second convex portion protrudes toward the bottom portion of the sleeve relative to the limit boss of the valve stem; wherein the buffer member is provided with an accommodating cavity, and the accommodating cavity has an opening facing the limit boss of the valve stem in the buffer member; wherein the second convex portion is located in the accommodating cavity, and the second convex portion is in clearance fit with the accommodating cavity.

2. The electromagnetic valve according to claim 1, further comprising a suction portion, wherein the movable iron core is located at the inner periphery of the sleeve, at least part of the movable iron core is closer to the bottom portion of the sleeve than the suction portion;

wherein the valve stem comprises a limit boss, which is formed at one end of the valve stem, wherein the limit boss is located in the hole and is limitedly connected with the hole portion, wherein the limit boss abuts against the other end of the first spring.

3. The electromagnetic valve according to claim 1, comprising a first convex portion and a first concave portion, wherein one of the first convex portion and the first concave portion is arranged at the bottom portion of the sleeve, and the other one of the first convex portion and the first concave portion is arranged at the buffer member, wherein the first convex portion is located in the first concave portion.

4. The electromagnetic valve according to claim 3, wherein the buffer member comprises the first convex portion, the first convex portion is formed on the main body portion and protrudes toward the bottom portion relative to the first wall; wherein the sleeve comprises the first concave portion, and the first concave portion is formed on the bottom portion; wherein, in the axial direction of the sleeve, the first concave portion has an opening on a lower surface of the bottom portion and is recessed relative to the lower surface of the bottom portion; wherein the first convex portion is in contact with the first concave portion.

5. The electromagnetic valve according to claim 3, wherein the sleeve comprises the first convex portion, and the first convex portion is formed on the bottom portion; wherein, in the axial direction of the sleeve, the first convex portion protrudes toward the buffer member relative to the lower surface of the bottom portion; wherein the buffer member comprises the first concave portion, and the first concave portion is formed on the main body portion, the first concave portion has an opening on a surface of the first wall and is recessed relative to the surface of the first wall.

6. The electromagnetic valve according to claim 1, wherein the sleeve comprises the first concave portion, and the first concave portion is formed on the bottom portion, wherein, in the axial direction of the sleeve, the first concave portion has an opening on a lower surface of the bottom portion and is recessed relative to the lower surface of the bottom portion, part of the main body portion is located in the first concave portion, the first wall is in contact with the bottom wall of the first concave portion, the second wall is located below the opening of the first concave portion, a side wall of the main body portion is in clearance fit with a side wall of the first concave portion.

\* \* \* \* \*